United States Patent

[11] 3,619,614

[72] Inventor: Eiso Yamaka, Osaka, Japan
[21] Appl. No.: 886,573
[22] Filed: Dec. 19, 1969
[45] Patented: Nov. 9, 1971
[73] Assignee: Matsushita Electric Industrial Company Limited, Osaka, Japan
[32] Priority: Dec. 25, 1968
[33] Japan
[31] 44/277

[54] AN INFRARED INTENSITY DETECTOR
2 Claims, 5 Drawing Figs.
[52] U.S. Cl. ................................................. 250/83.3 H, 73/355 R, 250/83
[51] Int. Cl. ........................................... G01t 1/16
[50] Field of Search .................................... 250/83.3 H, 83; 73/355

[56] References Cited
UNITED STATES PATENTS
3,091,693  5/1963  Rudomanski et al. ........ 250/83.3
3,484,611  12/1969  Futaki ........................... 250/83.3

Primary Examiner—James W. Lawrence
Assistant Examiner—Morton J. Frome
Attorney—John Lezdey ABSTRACT: An infrared intensity detector having a pair of detector elements, one shielded from and the other exposed to an incoming infrared radiation, and a thermostatted black body reference source of a characteristic temperature. The detector elements are made of a semiconductor having a remarkable temperature dependence of resistivity within a limited temperature range around the characteristic temperature. The detector offers increased detection sensitivity and finds a wide variety of applications especially where it is intended to measure an object of relatively low temperature.

PATENTED NOV 9 1971
3,619,614
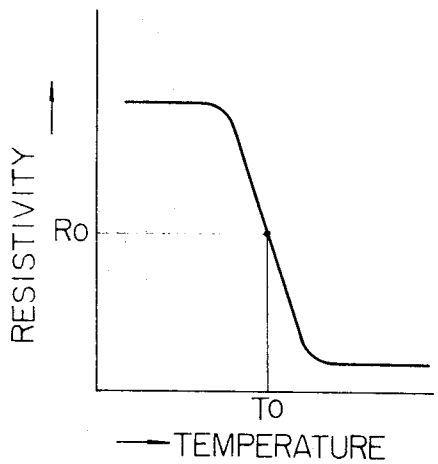
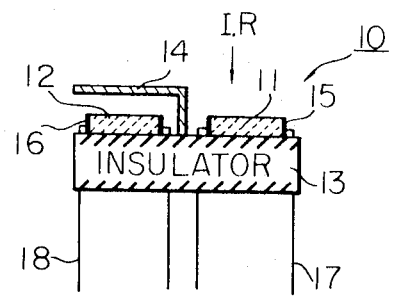
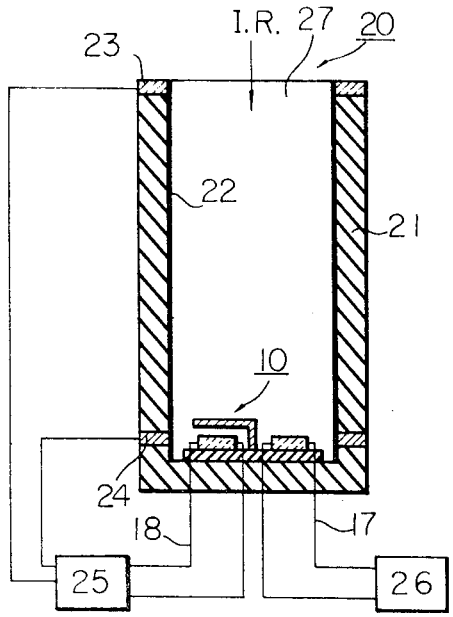
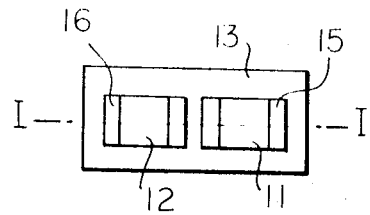
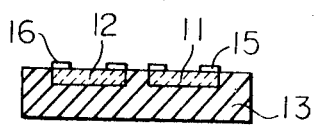
INVENTOR
EISO YAMAKA
BY
John Lezley
ATTORNEY

AN INFRARED INTENSITY DETECTOR

The present invention relates to an improved infrared intensity detector using a semiconductor that exhibits abrupt variation in resistivity as a result of temperature change around a critical temperature caused by modification of crystalline structure and, in particular, to an infrared intensity detector instrument provided with a thermostatted black body reference source of the characteristic temperature.

Conventional detector instruments utilize two detector elements having substantially the same temperature-resistivity characteristics over a relatively wide range of temperature. The two elements are positioned closely adjacent to and at a substantial spacing from each other so that they are placed under the same environmental conditions. With these arrangements one of these elements is exposed to the incoming infrared radiation while the other is shielded from the radiation by means of a suitable intercepting plate. Therefore, the shielded element is maintained at an ambient temperature to serve as a temperature reference source. If usual thermally sensitive resistors that are commercially known as thermistors are utilized for such elements, the irradiated element is heated by the infrared rays with the resultant temperature increase. The increase in temperature invites a certain reduction in the resistivity of the element. The difference in the resistance values of the two elements is known by the use of a suitable bridge circuit and is used to detect the emission intensity of the infrared rays. In spite of the reference element being used, the detector instruments of this type are unsatisfactory in terms of detection sensitivity. Although the thermistors have a temperature dependence of resistivity over a wide range of temperature, the rate of variation in the resistivity caused by a temperature change is not high enough to provide a sufficient sensitivity. As a result, even if the detector element is subjected to the infrared radiation of considerable intensity, the resistivity change in the element is insufficient for certain purposes. For this reason, the requirements for performance accuracy and sensitivity are not fully met within the conventional instruments, thereby limiting the applications they find.

The detector instruments according to the present invention employ semiconductors that exhibit a far steeper change than usual thermistors in resistivity around a characteristic temperature within a limited range. Such semiconductors are used in a pair as detector elements; one for detecting the incoming infrared radiation and the other for keeping the ambient temperature at the critical value. The former element is exposed to an incoming infrared radiation, as is the case of thermistors. The intensity of the radiation is, however, detected by the measurement of the resistivity change thereof without the use of such a bridge circuit. The latter element is shielded from the infrared rays to measure the temperature prevailing around the two elements with high sensitivity. Therefore, if the shielded element senses the difference between the measured and characteristic temperatures, the difference, after amplified, may be applied to a suitable heat generator to maintain the ambient temperature at a desired point. The detectors according to the invention, in its preferred form, may also be provided with an electrical furnace having a black resistive film on the inside surface thereof. In the vicinity of the film are mounted the two detector elements under substantially the same environmental conditions except that either of the elements is shielded. With this arrangement, properly controlled amount of heat is evolved in the resistive film to keep the shielded element at its critical temperature. In this manner the other element to detect the infrared radiation is also maintained precisely at the critical temperature.

On the other hand, the two elements are held at a close proximity to the resistive film so that the thermal resistance between the elements and film can be diminished to reduce the value of time constant. Thus, the temperature of the elements is held at the desired critical value in a quick response by the heat evolved in the resistive film.

Moreover, the resistive film is made of, for example, carbon or some metal oxides known under the trade name of "Glaze Resistors" so as to serve as a black body radiation source of the characteristic temperature. Therefore, an additional black body reference source is indispensable.

It is therefore an object of the present invention to provide an improved infrared intensity detector using two pieces of a highly sensitive semiconductor as detector elements, offering increased measurement sensitivity and finding wide practical applications.

It is another object of the invention to provide an improved infrared intensity detector having, in combination, a black body reference radiation source of the characteristic temperature, whereby the detector can be operated with increased performance accuracy.

The present invention will be described in greater detail in conjunction with the accompanying drawings in which:

FIG. 1 is a typical plot of resistivity against temperature of semiconductors applied for the detector elements of the invention;

FIG. 2 is a sectional view of the infrared intensity detector according to the invention;

FIG. 3a is a plan view of the substrate plate to fabricate the detector elements used in the detector of FIG. 2;

FIG. 3b is a section on line I—I of FIG. 3a; and

FIG. 4 is a sectional view showing a preferred example of the applications of the detector shown in FIG. 2.

In FIG. 1, the critical temperature of a certain semiconductor is represented by $T_o$, at which the crystalline structure of the semiconductor is modified and the resistivity in the semiconductor drops abruptly. The resistivity of the semiconductor corresponding to the temperature $T_o$ is represented by $R_o$. The semiconductors to be used in the infrared intensity detector according to the invention may be, by way of example, vanadium dioxide $VO_2$, divanadium trioxide $V_2O_3$, titanium monoxide TiO and silver sulfide $Ag_2S$. These semiconductors are known to show steep negative temperature characteristic in resistivity within a limited temperature range around $T_o$. Vanadium dioxide, in particular, is known to change its resistivity of about three digits about the critical temperature of 67° C. It is, therefore, necessary to accurately maintain the temperature of the detector elements at the characteristic value so as to make use of their steep negative temperature characteristic in resistivity.

In FIG. 2, an infrared intensity detector, which is shown generally by 10, comprises two detector elements 11 and 12 both of which are made of the same above-named semiconductive materials. The detector elements 11 and 12 are mounted closely adjacent to and at a substantial spacing from each other on a substrate plate 13 of an insulating material such as alumina or quartz. The detector element 12 is shielded by a suitable intercepting member 14 made of a material such as metal which is opaque to infrared radiation. A pair of terminal electrodes 15 and 16 of the detector elements 11 and 12, respectively, are connected with a voltage source (not shown) by way of lead wires 17 and 18, respectively.

The two detector elements 11 and 12 are maintained at the temperature $T_o$ with the resistivity of the element at the value of $R_o$. This temperature control is accomplished with use of the shielded element 12 serving as a temperature detector. When the value of resistivity of the shielded element or temperature detector 12 differs from the reference value $R_o$, this difference is amplified and used to control the resistivity of the element 12 to return to $R_o$ and to restore the temperature $T_o$. In this manner, the detector element 11 is also maintained at the temperature $T_o$.

In operation, when infrared rays irradiate the element 11 in the direction as designated by the arrow I.R. in the figure, then the element 11 is heated with the irradiation of the infrared rays and its temperature is augmented with the emission rate of the infrared radiation. This temperature increase causes the resistivity of the element 11 to suddenly decrease. The decrease of resistivity is detected by suitable electrical circuit arrangements (not shown) and is thereafter converted into radiation intensity.

FIGS. 3a and 3b show a method to fabricate the elements 11 and 12 integrally with the substrate plate 13. According to a conventional method, the elements 11 and 12 as utilized in the invention are fabricated by "vacuum evaporation," "sputtering" or "printing" on a plane substrate plate with use of a mask of desired shape. Such method, however, involves the use of a complex apparatus such as a vacuum pump and requires highly skilled techniques.

According to the method as proposed in the invention, a desired number of cavities of an appropriate shape are formed at predetermined positions in the substrate plate 13. The cavities are filled with a suitable filler material for such semiconductors. The material thus filled in the cavities is then dried or sintered with the substrate plate 13 to form the detector elements 11 and 12. This method has advantages as follows:

1. The material in the cavities is secured in the cavities during sintering process. The amount of material to be filled is, therefore, known accurately beforehand by calculating the capacity of the cavities so that a variation in the amount of the material can be precluded easily.
2. Since masks made of carbon or the like need not be used, the material is prevented from being mixed with impurities so that the purity of the elements as required is not degraded. This is considered important to keep the performance stability of the semiconductors.

Thus, the method as proposed by this invention is advantageous for fabricating the thin and small elements 11 and 12 having stable characteristics with required precision and reproducibility. In this method, moreover, the terminal electrodes 15 and 16 may be formed, if preferred, by evaporation on the opposite ends of the surfaces of the two elements 11 and 12.

FIG. 4 illustrates a preferred example of an infrared intensity detector instrument using the elements above mentioned. The detector instrument is generally shown by 20 and comprises, as customary, the detector 10 shown in FIG. 2, a hollow furnace element 21 having an envelope of insulator such as alumina or quartz. The furnace member 21 is opened at one end and closed at the other, as shown. A black thin resistive film 22 made of carbon or some metal oxides known commercially under the trade name of "Glaze Resistors" is coated on the inside surface of the envelope of the furnace member 21. A pair of annular electrodes 23 and 24 are mounted on the upper and lower ends, respectively, of the envelope. A suitable temperature control amplifier 25 is provided between the resistive film 22 and element 12 through the lead wire 18 for regulating the voltage supplied to the film 22 so as to keep the resistivity of the element 12 at $R_o$. A suitable signal amplifier 26 is electrically connected with the element 11 by way of the lead wire 17 for detecting the infrared rays irradiated to the element 11. The detector element 10 is shown as constructed similarly to that shown in FIG. 2 for illustrative purposes, but the detector elements 11 and 12 thereof may be replaced with the elements fabricated in the method shown in FIGS. 3a and 3b, if desired.

The whole furnace 20 is preliminarily heated by the resistive film 22 and is maintained at the characteristic temperature $T_o$, as previously discussed. In operation, the infrared rays I.R. emitted from an object under inspection pass through an aperture 27 formed at the open end of the furnace 20 and irradiate the detector element 11. Then the resistivity of the element 11 decreases abruptly due to the temperature increase thereof to a point suited to detect the radiation intensity by means of the signal amplifier 26.

This construction arrangement of the detector instruments of the invention provides a number of advantages. Because the resistive film 22 is coated on the inside surface of the furnace envelope and because the detector elements 11 and 12 are in thermally intimate contact with the film 22 with the substrate plate 13 having a negligible heat capacity interposed therebetween, the thermal time constant dictating the heat flow between the resistive film 22 and the detector elements 11 and 12 can be reduced to a negligible extent. Thus, the furnace can be held in its entirely at a constant temperature $T_o$ with required high accuracy. On the other hand, the resistive film 22 is made of, for example, coated carbon so that it serves as a black body reference radiation source, thereby dispensing with an additional black body reference furnace. What is more important, the detector elements 11 and 12 having a great temperature dependence of resistivity, the detector instruments using such detector elements offer high sensitivity to infrared radiation.

The detector instruments according to the present invention can be applied for a wide variety of practical applications. For one thing, the instruments can be employed advantageously for measuring an object of high temperature such as a usual electrical furnace. In this instance, a large amount of infrared radiation is emitted from the object so that the measurement of the temperature thereof can be conducted with utmost ease. If preferred, there may be provided a suitable frustoconical attachment at the open end of the furnace envelope so as to attenuate the amount of the incoming infrared radiation to a reasonable value. The instruments of the invention will also lend themselves to detecting an object of relatively low temperature, because of the detector elements being satisfactorily sensitive to the infrared rays. This application is considered very important from the practical point of view, where it is intended to detect and inspect a failure of malfunction in a human body or to locate a failure in an integrated circuit. A portion involving such failure or malfunction is usually locally heated to a higher temperature than the environments, so that infrared rays are emitted therefrom with an appreciably higher intensity.

What is claimed is:

1. An infrared intensity detector for detecting the intensity of an infrared radiation, comprising a hollow furnace having a resistive film coated on the inside surface thereof, first and second detector elements made of a semiconductive material having a steep negative temperature characteristic in resistivity within a limited temperature range around a critical temperature, said elements being disposed in said furnace and said first element facing infrared radiation to be detected for detecting the intensity thereof and said second element being shielded from the infrared radiation, and a temperature control amplifier for maintaining the temperature in said furnace at said critical temperature connected to said detector element and to said resistive film.

2. An infrared intensity detector according to claim 1, wherein said semiconductive material is a material selected from the group consisting of vanadium dioxide, divanadium trioxide, titanium monoxide and silver sulfide.

* * * * *